United States Patent
Miyazaki

(10) Patent No.: US 8,665,703 B2
(45) Date of Patent: Mar. 4, 2014

(54) COMMUNICATION CONTROL APPARATUS AND COMMUNICATION CONTROL METHOD

(75) Inventor: Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 269 days.

(21) Appl. No.: 13/301,911

(22) Filed: Nov. 22, 2011

(65) Prior Publication Data
US 2012/0188866 A1 Jul. 26, 2012

(30) Foreign Application Priority Data

Jan. 25, 2011 (JP) ................. 2011-013477

(51) Int. Cl.
*H04L 12/26* (2006.01)
(52) U.S. Cl.
USPC ........... 370/217; 370/225; 370/252; 370/248; 370/241; 714/710; 714/718; 714/776; 714/712
(58) Field of Classification Search
USPC .......... 370/217, 252, 248, 241, 225; 711/203, 711/170, 202, 216, 221, 128; 714/710, 718, 714/712
See application file for complete search history.

(56) References Cited

U.S. PATENT DOCUMENTS

| | | | |
|---|---|---|---|
| 6,731,596 B1 * | 5/2004 | Chiang et al. | 370/217 |
| 6,910,161 B2 * | 6/2005 | Kuhn et al. | 714/710 |
| 7,107,501 B2 * | 9/2006 | Ohlhoff et al. | 714/723 |
| 7,546,496 B2 * | 6/2009 | Koyanagi et al. | 714/712 |
| 7,778,193 B2 * | 8/2010 | Mizuno et al. | 370/252 |
| 8,170,033 B1 * | 5/2012 | Kothari et al. | 370/395.53 |
| 2006/0107188 A1 | 5/2006 | Koyanagi et al. | |
| 2009/0323689 A1 | 12/2009 | Saito | |

FOREIGN PATENT DOCUMENTS

| | | |
|---|---|---|
| JP | 2006-135382 | 5/2006 |
| WO | 2008/111128 | 9/2008 |

\* cited by examiner

*Primary Examiner* — Rasheed Gidado

(74) *Attorney, Agent, or Firm* — Staas & Halsey LLP

(57) ABSTRACT

A communication control apparatus includes a storage unit and a processor. The storage unit stores, in association with a port number, first address information regarding apparatuses connected to a port identified by the port number. The processor receives a first affected address list containing second address information regarding apparatuses which may be affected by a trouble, extracts the first address information stored in the storage unit in association with a port number of a port via which the first affected address list has been received, selects third address information which is included in both the first and second address information, updates the first affected address list by replacing the second address information with the third address information to acquire a second affected address list, and transmits the second affected address list via each port other than the port via which the first affected address list has been received.

5 Claims, 14 Drawing Sheets

| SrcMac | PORT No. |
|---|---|
| MAC_A | P1 |
| MAC_B | P2 |
| MAC_C | P1 |
| MAC_D | P3 |
| MAC_E | P2 |
| MAC_F | P1 |

| MAC_AFFECTED DEVICE |
|---|
| MAC_A |
| MAC_C |
| MAC_E |

| RECORD No. | SrcMac | PORT No. |
|---|---|---|
| 1 | MAC_B | P2 |
| 2 | MAC_D | P3 |
| 3 | MAC_F | P2 |

| RECORD No. | SrcMac | PORT No. |
|---|---|---|
| 1 | MAC_A | P1 |
| 2 | MAC_B | P2 |
| 3 | MAC_C | P1 |
| 4 | MAC_D | P3 |
| 5 | MAC_E | P1 |
| 6 | MAC_F | P2 |

| RECORD No. | SrcMac | PORT No. |
|---|---|---|
| 1 | MAC_A | P1 |
| 2 | MAC_B | P2 |
| 3 | MAC_C | P2 |
| 4 | MAC_D | P3 |
| 5 | MAC_E | P4 |
| 6 | MAC_F | P1 |

| RECORD No. | SrcMac | PORT No. |
|---|---|---|
| 1 | MAC_B | P2 |
| 2 | MAC_C | P2 |
| 3 | MAC_D | P3 |
| 4 | MAC_E | P4 |
| 5 | MAC_F | P1 |

FIG. 9

| RECORD No. | SrcMac | PORT No. |
|---|---|---|
| 1 | MAC_A | P2 |
| 2 | MAC_B | P2 |
| 3 | MAC_C | P2 |
| 4 | MAC_D | P3 |
| 5 | MAC_E | P4 |
| 6 | MAC_F | P1 |

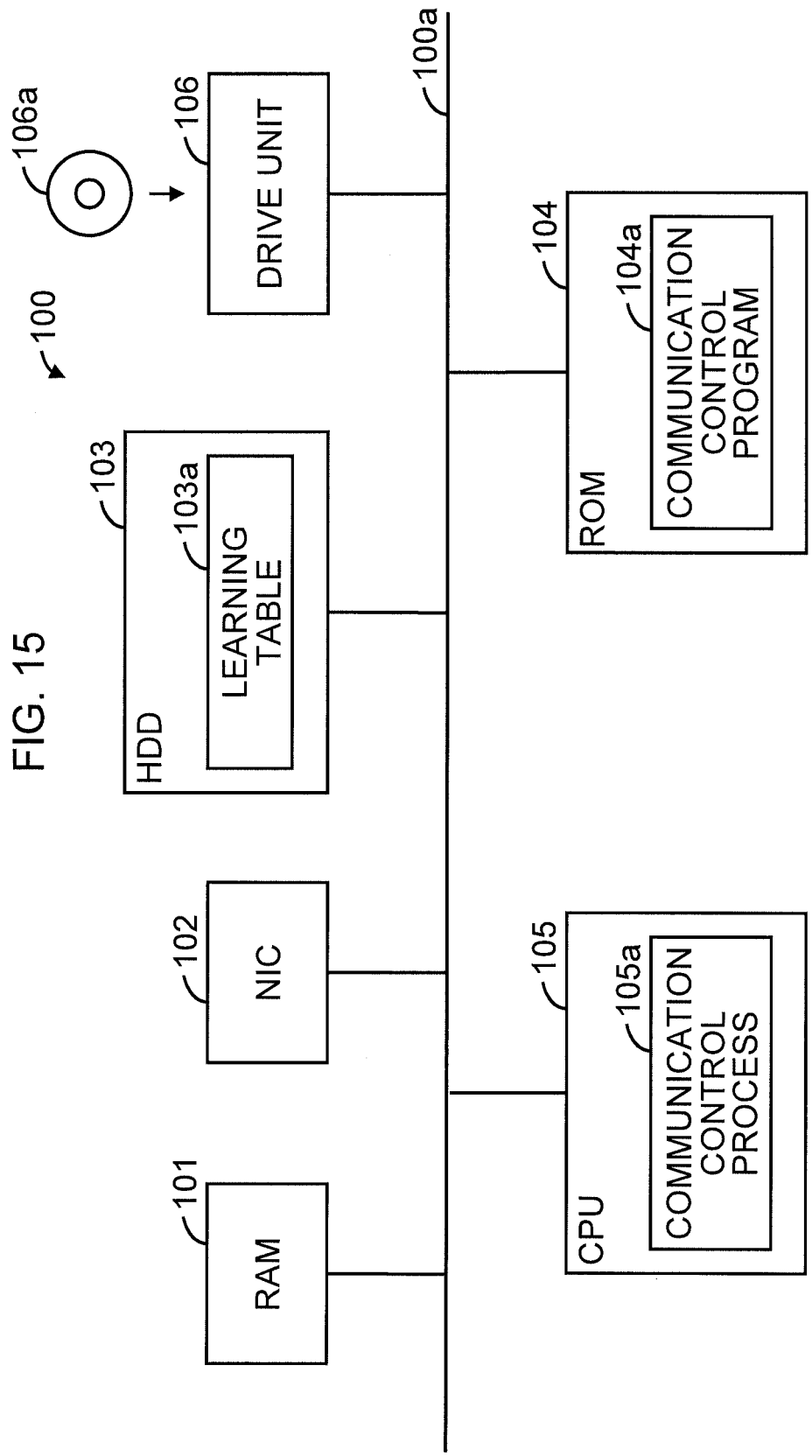

COMMUNICATION CONTROL APPARATUS AND COMMUNICATION CONTROL METHOD

CROSS-REFERENCE TO RELATED APPLICATION

This application is based upon and claims the benefit of priority of the prior Japanese Patent Application No. 2011-013477, filed on Jan. 25, 2011, the entire contents of which are incorporated herein by reference.

FIELD

The embodiments discussed herein are related to a communication control apparatus and a communication control method.

BACKGROUND

Communication control apparatuses such as an Ethernet (registered trademark) switch have conventionally been employed in networks such as a wide-area Ethernet and a local area network (LAN), for controlling data transfer. Such a communication control apparatus has a plurality of ports for connection to a server or other communication control apparatuses.

The communication control apparatus holds a learning table containing sets of a port number and an associated media access control (MAC) address of an apparatus connected via a port identified by the port number, and transfers received data to a destination in accordance with the learning table.

An example of a learning process regarding the learning table performed by the communication control apparatus will be discussed. Here, it is assumed that the communication control apparatus receives data X via a port P1 (the "port P1" refers to a port identified by a port number "P1"), that the data X has an address MAC_A as a source address and an address MAC_B as a destination address, and that the address MAC_A has not yet been registered in the learning table.

In this case, the communication control apparatus registers the source address MAC_A in association with the port number P1. In the case where the destination address MAC_B has been registered in the learning table, the communication control apparatus transmits the data X via the port identified on the basis of the learning table. In the case where the destination address MAC_B has not been registered in the learning table, the communication control apparatus floods the data X via the ports other than the port P1.

Thus, the communication control apparatus may associate the address MAC_A with the port P1, and when data destined for the address MAC_A is received via another port, the communication control apparatus may transmit that data via the port P1, instead of flooding.

Upon detecting a trouble at a port P2, the communication control apparatus identifies, on the basis of the learning table, addresses of the apparatuses connected to the port P2 and floods, to all the ports, a flush message containing the identified addresses as addresses of apparatuses which may be affected by the trouble. Upon receiving the flush message, other communication control apparatuses delete, from the learning table, information related to the addresses contained in the flush message, and floods the received flush message via all the ports other than the port via which the flush message has been received.

International Publication No. 2008/111128 and Japanese Patent No. 4473700 disclose related techniques.

SUMMARY

According to an aspect of the present invention, provided is a communication control apparatus including a communication interface, a storage unit, and a processor. The communication interface includes a plurality of ports connected to external apparatuses. The storage unit stores, in association with a port number, first address information regarding apparatuses connected to a port identified by the port number. The processor receives a first affected address list containing second address information regarding apparatuses which may be affected by a trouble, extracts the first address information stored in the storage unit in association with a port number of a port via which the first affected address list has been received, selects third address information which is included in both the first address information and the second address information, updates the first affected address list by replacing the second address information with the third address information to acquire a second affected address list, and transmits the second affected address list via each port other than the port via which the first affected address list has been received.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 9 is a diagram illustrating an exemplary learning table held in a communication control apparatus according to an embodiment of the present invention;

FIG. 15 is a diagram illustrating an exemplary system configuration of a computer system that executes a communication control program.

DESCRIPTION OF EMBODIMENTS

Such conventional techniques have a drawback in that unnecessary flooding may be caused. According to such conventional techniques, for example, the flush message is transmitted to all the communication control apparatuses in the network when a trouble occurs, and therefore unnecessary flooding is caused to communication control apparatuses which may be unaffected by the trouble.

Furthermore, information stored in a learning table of a communication control apparatus which may be unaffected by the trouble is also deleted, and hence the deleted addresses have to be relearned for the learning table. As a result, unnecessary flooding may be caused along with the relearning for the learning table.

Thus, it is preferable to provide a communication control apparatus and a communication control method capable of preventing unnecessary flooding from being caused.

The embodiments may prevent unnecessary flooding from being caused.

Hereinafter, embodiments of a communication control apparatus and a communication control method will be discussed in detail with reference to the drawings. It is to be understood that embodiments are in no way limited to the following embodiments. The communication control apparatus referred to in the embodiments may be exemplified by apparatuses employed in a network for controlling data transfer, such as an Ethernet switch, a switching hub, a layer-2 switch, a router, a layer-3 switch, a server having a switching function, and so forth.

First Embodiment

Figure 1:
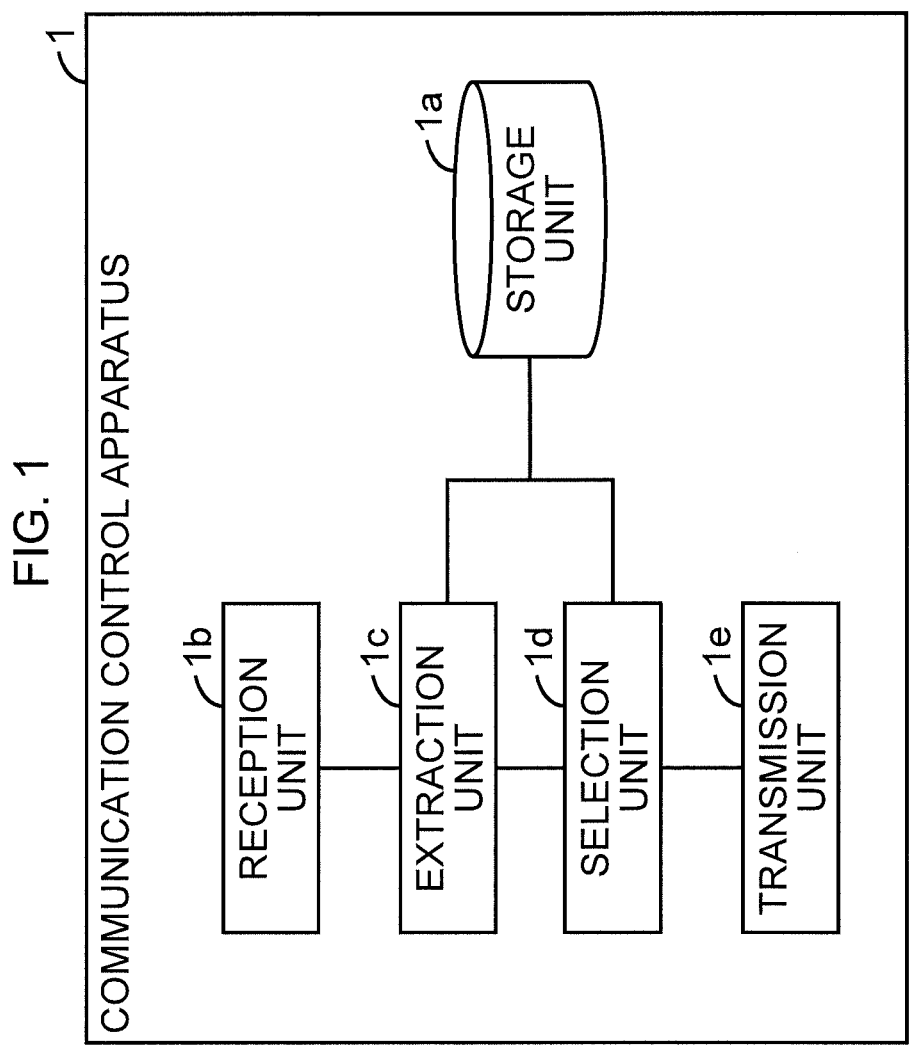
FIG. 1 is a diagram illustrating an exemplary functional configuration of a communication control apparatus according to an embodiment of the present invention.

FIG. 1 illustrates an exemplary functional configuration of a communication control apparatus according to a first embodiment. As illustrated in FIG. 1, the communication control apparatus 1 includes a storage unit 1a, a reception unit 1b, an extraction unit 1c, a selection unit 1d, and a transmission unit 1e, and transfers received data to a destination in accordance with information stored in the storage unit 1a.

The storage unit 1a stores address information regarding apparatuses connected to a port in association with a port number for identifying the port. The reception unit 1b receives an affected address list containing address information regarding apparatuses that may be affected by the trouble. The extraction unit 1c extracts from the storage unit 1a, when the reception unit 1b receives the affected address list, the address information associated with a port number for identifying a port via which the affected address list has been received. The selection unit 1d generates new address information containing address information contained in common in both of the address information extracted by the extraction unit 1c and the address information contained in the affected address list received by the reception unit 1b. The transmission unit 1e updates the affected address list by replacing the address information contained in the affected address list with the new address information generated by the selection unit 1d, and transmits the updated affected address list via the ports other than the port via which the affected address list has been received.

Thus, the communication control apparatus 1 according to the first embodiment updates the received affected address list to a new affected address list containing only address information related to the route in trouble. Since the communication control apparatus 1 transfers the updated affected address list to other apparatuses, only the address information regarding apparatuses that may be affected by the trouble are initialized, and consequently unnecessary flooding may be prevented.

Second Embodiment

A communication control apparatus according to a second embodiment will now be discussed in the order of a functional configuration of the communication control apparatus, an example of operation, an operation flow, and advantageous effects of the present embodiment.

Figure 2:
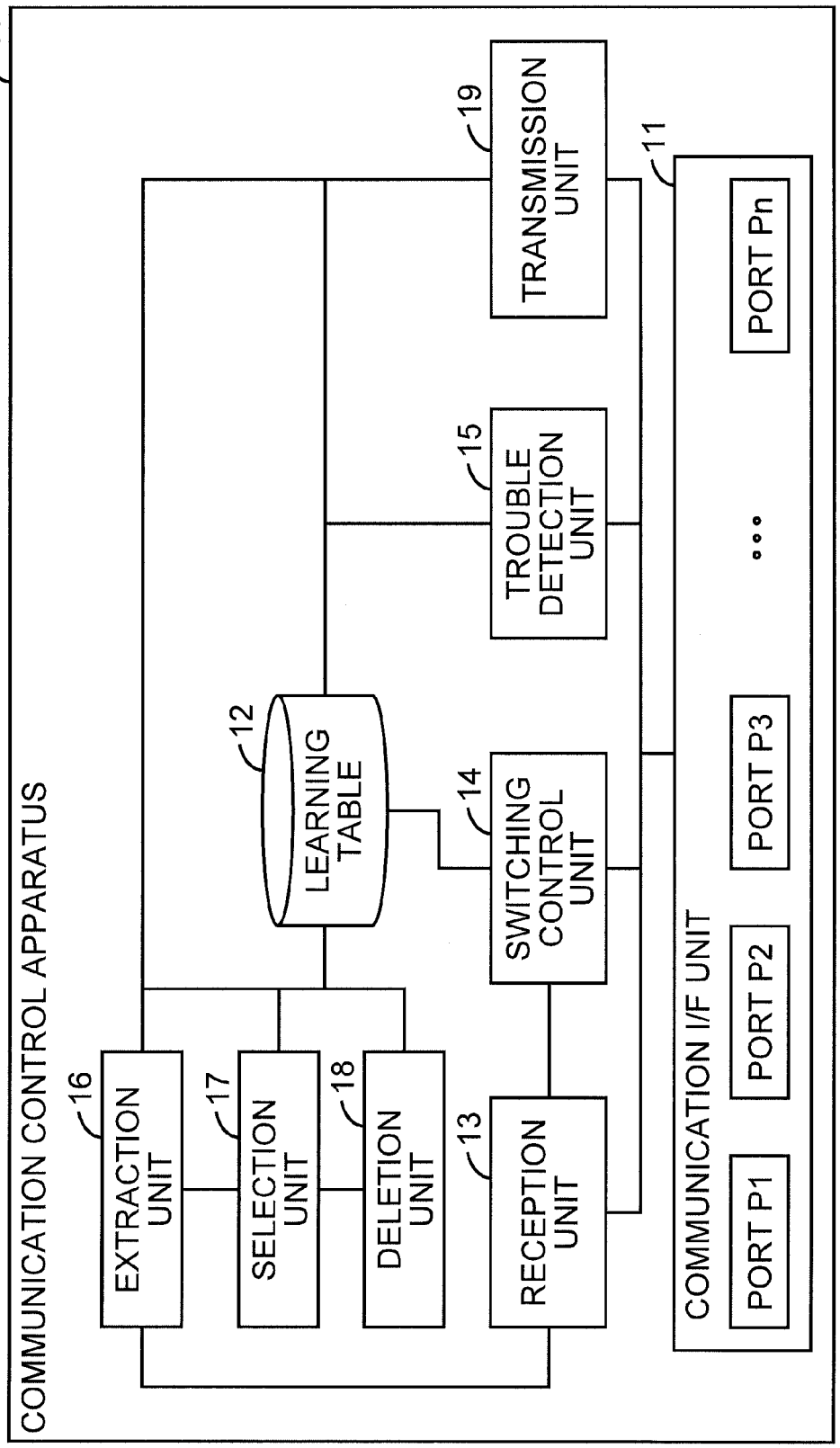
FIG. 2 is a diagram illustrating an exemplary functional configuration of a communication control apparatus according to an embodiment of the present invention.

Functional Configuration of Communication Control Apparatus according to Second Embodiment FIG. 2 illustrates an exemplary functional configuration of a communication control apparatus according to the present embodiment. As illustrated in FIG. 2, the communication control apparatus 10 includes a communication interface (I/F) unit 11, a learning table 12, a reception unit 13, a switching control unit 14, a trouble detection unit 15, an extraction unit 16, a selection unit 17, a deletion unit 18, and a transmission unit 19. It is to be noted that the components illustrated in FIG. 2 are only exemplary, and different components may be employed.

Figures 3, 4:
FIG. 3 is a diagram illustrating exemplary information stored in a learning table according to an embodiment of the present invention.
FIG. 4 is a diagram illustrating exemplary information contained in an affected address list according to an embodiment of the present invention.

The communication I/F unit 11 includes a port P1, a port P2, a port P3 to a port Pn (n is a natural number), and controls reception and transmission of data from and to other apparatuses. For example, the communication I/F unit 11 outputs data, such as packets and frames, received via one of the ports P1 to Pn to the reception unit 13. The communication I/F unit 11 transmits data inputted from the transmission unit 19 to a destination via one of the ports P1 to Pn. The "P1" to "Pn" are port numbers for identifying respective ports included in the communication I/F unit 11, The learning table 12 stores routing information learned by the switching control unit 14. FIG. 3 illustrates exemplary information stored in the learning table 12 according to the present embodiment. As illustrated in FIG. 3, the learning table 12 contains a "source MAC address" (denoted by "Src-Mac" in the drawings) item and a "port number" (denoted by "PORT No." in the drawings) item in association with each other. The "source MAC address" item stores a learned MAC address of a transmission source, that is, an apparatus connected to the communication control apparatus 10 via a corresponding port. The "port number" item stores an identifier for uniquely identifying respective ports.

In the example illustrated in FIG. 3, an apparatus having a MAC address MAC_A is connected to a port having a port number P1, which means that data to be transmitted to the apparatus having the MAC address MAC_A is transmitted via the port having the port number P1. An apparatus having a MAC address MAC_B is connected to a port having a port number P2, which means that data to be transmitted to the apparatus having the MAC address MAC_B is transmitted via the port having the port number P2. An apparatus having a MAC address MAC_C is connected to the port having the port number P1, which means that data to be transmitted to the apparatus having the MAC address MAC_C is transmitted via the port having the port number P1.

An apparatus having a MAC address MAC_D is connected to a port having a port number P3, which means that data to be transmitted to the apparatus having the MAC address MAC_D is transmitted via the port having the port number P3. An apparatus having a MAC address MAC_E is connected to the port having the port number P2, which means that data to be transmitted to the apparatus having the MAC address MACE is transmitted via the port having the port number P2. An apparatus having a MAC address MAC_F is connected to the port having the port number P1, which means that data to be transmitted to the apparatus having the MAC address MAC_F is transmitted via the port having the port number P1.

The reception unit 13 illustrated in FIG. 2 receives data via the respective ports of the communication I/F unit 11. The reception unit 13 refers to, for example, a header or a payload of data received via the respective ports. Upon receiving a flush message containing an affected address list, the reception unit 13 outputs the received flush message to the extraction unit 16. Upon receiving ordinary data other than the flush message, the reception unit 13 outputs the received data to the switching control unit 14. Upon receiving a message, such as a simple network management protocol (SNMP) trap, indicating that a trouble has been detected, the reception unit 13 outputs the received message to the trouble detection unit 15. Here, the reception unit 13 may also output a port number of a port via which the data has been received, to the mentioned component.

The switching control unit 14 performs routing control for determining a route through which the data received by the reception unit 13 is to be transmitted to the destination. For example, the switching control unit 14 receives, from the reception unit 13, the data and the port number of the port via which the data has been received, and acquires a destination MAC address from the header of the received data. Then the switching control unit 14 determines whether the destination MAC address acquired from the received data has been registered in the learning table 12.

In the case where the MAC address has been registered in the learning table 12, the switching control unit 14 determines a port number corresponding to the registered MAC address on the basis of the learning table 12. The switching control unit 14 then transmits the received data via a port identified by the determined port number. In the case where the MAC address has not been registered in the learning table 12, the switching control unit 14 floods the received data. In other words, the switching control unit 14 transmits the received data via the ports other than the port via which the data has been received.

A learning process regarding the learning table 12 will be discussed. The switching control unit 14 acquires a source MAC address from the header of the received data. Then the switching control unit 14 determines whether the source MAC address acquired from the received data has been registered in the learning table 12.

In the case where the source MAC address has not been registered in the learning table 12, the switching control unit 14 learns the source MAC address. Specifically, the switching control unit 14 stores a port number of the port via which the data, from which the source MAC address has been extracted, has been received and the source MAC address in the learning table 12, in association with each other.

An example of the learning process regarding the learning table 12 will be discussed with reference to FIG. 3. Supposing, for example, that the reception unit 13 has received data containing a source MAC address MAC_G via a port P5, and outputted the received data and the port number P5 to the switching control unit 14. The switching control unit 14 looks up the learning table 12 and determines that the address MAC_G has not been registered in the learning table 12. Then the switching control unit 14 stores the address MAC_G and the port number P5 in the learning table 12 in association with each other.

The trouble detection unit 15 illustrated in FIG. 2, generates a flush message containing an affected address list upon detecting a trouble, and transmits the flush message via the respective ports. The trouble detection unit 15 detects a trouble, for example, in the case where the reception unit 13 has received a trouble detection message, where a network monitor or the like watching the ports has detected data congestion, or where a physical hardware error has been detected. Various known methods may be employed, such as watchdog software and SNMP, in order for the trouble detection unit 15 to detect a trouble.

For example, when a trouble is detected at the port P1, the trouble detection unit 15 looks up the learning table 12 illustrated in FIG. 3, and extracts the address MAC_A, the address MAC_C, and the address MAC_F which are associated with the port number P1. Then the trouble detection unit 15 generates a flush message containing an affected address list that contains the address MAC_A, the address MAC_C, and the address MAC_F extracted as above. Thereafter, the trouble detection unit 15 transmits the generated flush message via the ports other than the port P1 where the trouble has been detected.

In the case where the reception unit 13 has received a flush message containing an affected address list, the extraction unit 16 extracts, from the learning table 12, address information associated with a port number identifying the port via which the flush message has been received. For example, supposing that the reception unit 13 has received a flush message containing an affected address list via the port P1. Then, the extraction unit 16 receives the port number P1 and the flush message from the reception unit 13.

The extraction unit 16 then extracts the address MAC_A, the address MAC_C, and the address MAC_F associated with the port number P1, and outputs these addresses to the selection unit 17. The extraction unit 16 also outputs the port number P1 and the flush message received from the reception unit 13, to the selection unit 17.

The selection unit 17 selects address information contained in common in both the address information extracted by the extraction unit 16 and the address information contained in the affected address list received by the reception unit 13. FIG. 4 illustrates exemplary information contained in the affected address list according to the present embodiment. As an example, the case where the reception unit 13 has received a flush message containing an affected address list that contains information illustrated in FIG. 4 will be discussed.

In this case, the selection unit 17 receives the flush message containing the affected address list that contains information illustrated in FIG. 4 from the extraction unit 16, and extracts the address MAC_A, the address MAC_C, and the address MAC_E from the affected address list. The selection unit 17 also receives, from the extraction unit 16, the address MAC_A, the address MAC_C, and the address MAC_F registered in the learning table 12 as address information associated with the port number P1 of the port via which the flush message has been received.

Then the selection unit 17 compares the address MAC_A, the address MAC_C, and the address MAC_E extracted from the flush message with the address MAC_A, the address MAC_C, and the address MAC_F received from the extraction unit 16. As a result, the selection unit 17 selects the address MAC_A and the address MAC_C as the address information contained in common in both pieces of address information. Thereafter, the selection unit 17 outputs the selected addresses MAC_A and MAC_C and the port number P1 of the port via which the flush message has been received, to the deletion unit 18 and the transmission unit 19.

The deletion unit 18 deletes, from the learning table 12, the address information selected by the selection unit 17. Specifically, in the case of the foregoing example, the deletion unit 18 receives the addresses MAC_A and MAC_C from the selection unit 17. Then the deletion unit 18 looks up the learning table 12 and deletes a record of "source MAC address MAC_A, port number P1" which contains the address MAC_A, and a record of "source MAC address MAC_C, port number P1" which contains the address MAC_C, from the learning table 12.

The transmission unit 19 updates the affected address list by replacing the address information contained in the affected address list with the address information selected by the selection unit 17, and transmits a new flush message containing the updated affected address list via the ports other than the port via which the flush message containing the affected address list before the update has been received. For example, the transmission unit 19 receives from the selection unit 17 the selected addresses MAC_A and MAC_C, the received flush message, and the port number P1 of the port via which the flush message has been received.

Then the transmission unit 19 updates the affected address list by replacing "address MAC_A, address MAC_C, address MAC_E" contained in the received flush message with the "address MAC_A, address MAC_C" selected by the selection unit 17, to generate a new affected address list. Thereafter, the transmission unit 19 transmits a new flush message containing the new affected address list via each of the ports except for the port P1 via which the original flush message has been received. In the case where the selection unit 17 has determined that none of the addresses is contained in common in both pieces of the information as a result of the comparison, the transmission unit 19 aborts to flood the received flush message.

Specific Example of Operations according to Second Embodiment

Figure 5:
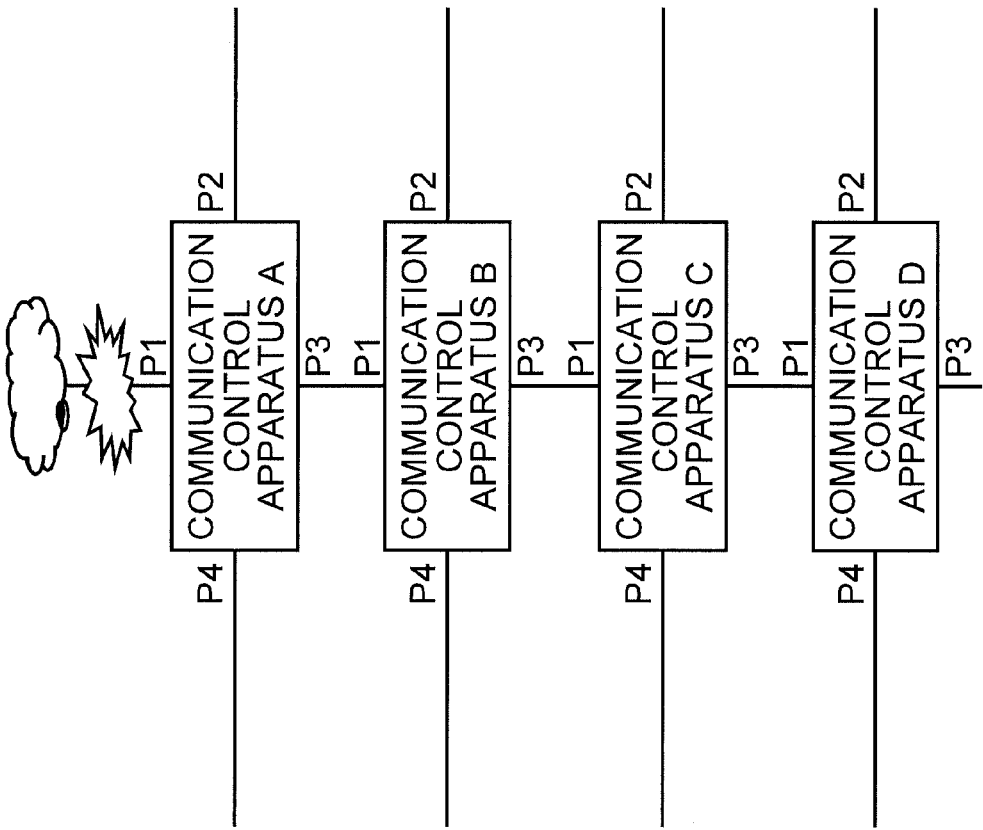
FIG. 5 is a diagram illustrating an exemplary configuration of a system including communication control apparatuses according to an embodiment of the present invention.

FIG. 5 illustrates an exemplary configuration of a system including the communication control apparatuses according to the present embodiment.

Figure 6:
FIG. 6 is a diagram illustrating an exemplary learning table held in a communication control apparatus according to an embodiment of the present invention.
Figure 7:
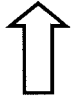
FIG. 7 is a diagram illustrating an exemplary learning table held in a communication control apparatus according to an embodiment of the present invention.
Figure 8:
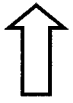
FIG. 8 is a diagram illustrating an exemplary learning table held in a communication control apparatus according to an embodiment of the present invention.
Figure 10:
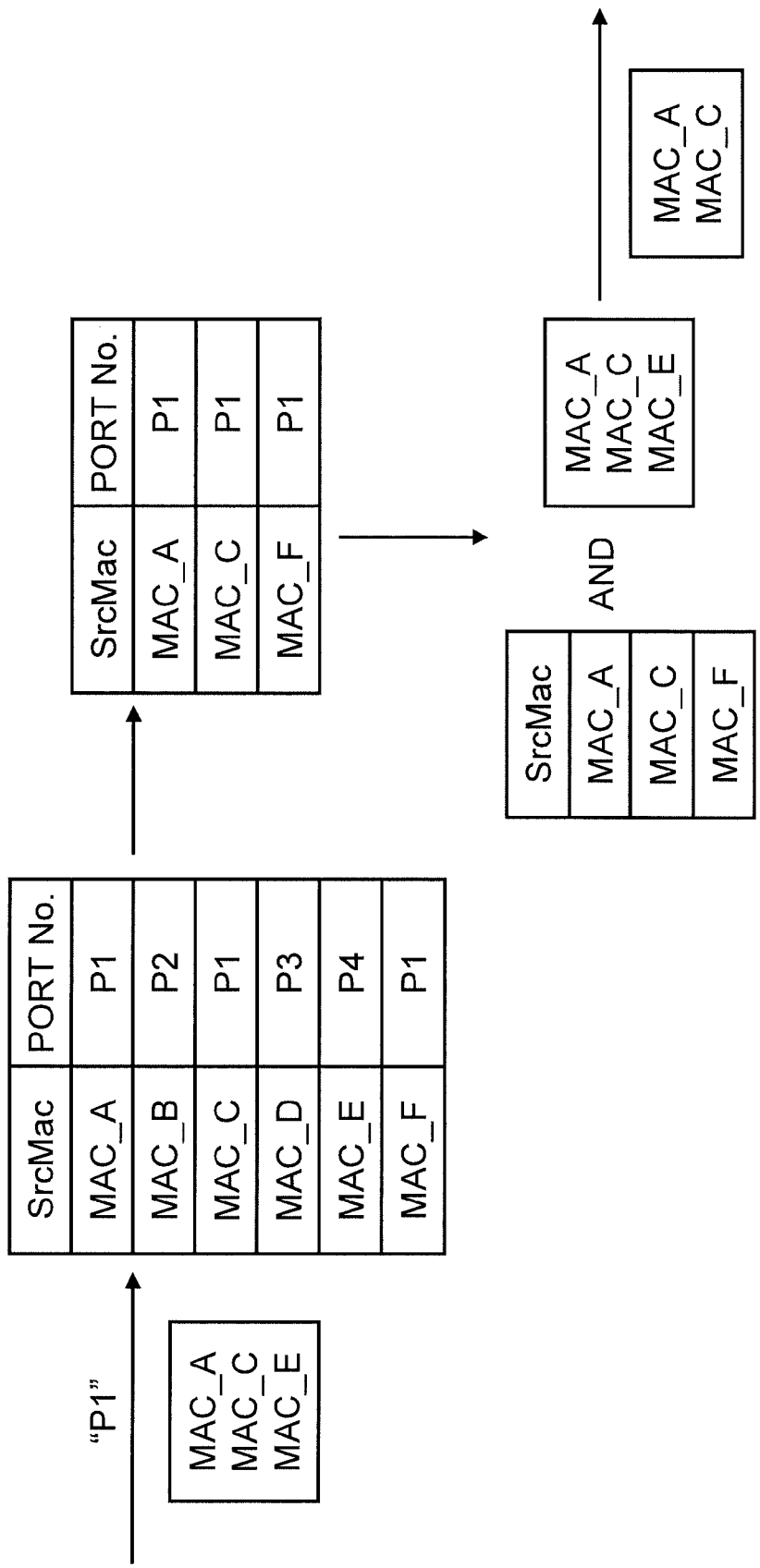
FIG. 10 is a diagram illustrating an exemplary operation of updating a flush message according to an embodiment of the present invention.

FIG. 6 illustrates an exemplary learning table held in the communication control apparatus A. FIG. 7 illustrates an exemplary learning table held in the communication control apparatus B. FIG. 8 illustrates an exemplary learning table held in the communication control apparatus C. FIG. 9 illustrates an exemplary learning table held in the communication control apparatus D. FIG. 10 illustrates an exemplary operation of updating a flush message held in the communication control apparatus B. A specific example of operations of the communication control apparatus according to the present embodiment will be discussed with reference to FIGS. 5 to 10.

As illustrated in FIG. 5, the communication control apparatus A, the communication control apparatus B, the communication control apparatus C, and the communication control apparatus D are communicably connected with one another in this system. Specifically, the communication control apparatus A is connected via its port P3 to the communication control apparatus B. The communication control apparatus B is connected via its port P1 to the communication control apparatus A, and via its port P3 to the communication control apparatus C. The communication control apparatus C is connected via its port P1 to the communication control apparatus B, and via its port P3 to the communication control apparatus D. The communication control apparatus D is connected via its port P1 to the communication control apparatus C. The ports of the respective apparatuses other than those mentioned above are connected to other apparatuses or other networks which are not illustrated.

The communication control apparatus A holds a learning table containing records of "record number, source MAC address, port number", specifically, "1, MAC_A, P1", "2, MAC_B, P2", "3, MAC_C, P1", "4, MAC_D, P3", "5, MAC_E, P1", and "6, MAC_F, P2", as illustrated on the left in FIG. 6. The communication control apparatus B holds a learning table containing records of "record number, source MAC address, port number", specifically, "1, MAC_A, P1", "2, MAC_B, P2", "3, MAC_C, P1", "4, MAC_D, P3", "5, MAC_E, P4", and "6, MAC_F, P1", as illustrated on the left in FIG. 7.

The communication control apparatus C holds a learning table containing records of "record number, source MAC address, port number", specifically, "1, MAC_A, P1", "2, MAC_B, P2", "3, MAC_C, P2", "4, MAC_D, P3", "5, MAC_E, P4", and "6, MAC_F, P1", as illustrated on the left in FIG. 8. The communication control apparatus D holds a learning table containing records of "record number, source MAC address, port number", specifically, "1, MAC_A, P2", "2, MAC_B, P2", "3, MAC_C, P2", "4, MAC_D, P3", "5, MAC_E, P4", and "6, MAC_F, P1", as illustrated in FIG. 9.

It is assumed that, in such a situation, the communication control apparatus A has detected a trouble at the port P1, as illustrated in FIG. 5. In this case, the communication control apparatus A identifies, on the basis of the learning table, the addresses "MAC_A, MAC_C, MAC_E" as the addresses associated with the port number P1 where the trouble has been detected. Then the communication control apparatus A deletes the records containing one of the identified addresses "MAC_A, MAC_C, MAC_E" from the left table in FIG. 6, and renumbers the remaining records as illustrated on the right in FIG. 6. The communication control apparatus A generates a flush message containing an affected address list that contains the identified addresses "MAC_A, MAC_C, MAC_E", and transmits the generated flush message via the ports other than the port P1, namely via the ports P2, P3, and P4.

The communication control apparatus B receives the flush message transmitted from the communication control apparatus A via the port P1. The communication control apparatus B then looks up the learning table held therein and extracts the addresses "MAC_A, MAC_C, MAC_F" associated with the port number P1 via which the flush message has been received, as illustrated in FIG. 10. The communication control apparatus B compares the addresses "MAC_A, MAC_C, MAC_E" contained in the received flush message with the addresses "MAC_A, MAC_C, MAC_F" extracted from its own learning table, and selects the addresses "MAC_A, MAC_C" contained in common in both the flush message and the learning table. Thereafter, the communication control apparatus B updates the affected address list "MAC_A, MAC_C, MAC_E" contained in the received flush message to the selected "MAC_A, MAC_C". Then the communication control apparatus B transmits a new flush message containing the updated affected address list "MAC_A, MAC_C" via the ports other than the port P1 via which the old flush message has been received, namely via the ports P2, P3, and P4. The communication control apparatus B also deletes the records containing one of the selected addresses "MAC_A, MAC_C" from the left table in FIG. 7, and renumbers the remaining records as illustrated on the right in FIG. 7.

The communication control apparatus C receives the flush message transmitted from the communication control apparatus B via the port P1. Similarly to the communication control apparatus B, the communication control apparatus C looks up its own learning table, and extracts the addresses "MAC_A, MAC_F" associated with the port number P1 via which the flush message has been received. Then the communication control apparatus C compares the addresses "MAC_A, MAC_C" contained in the received flush message with the addresses "MAC_A, MAC_F" extracted from its own learning table, and selects the address "MAC_A" contained in common in both of the received flush message and its own learning table. Thereafter, the communication control apparatus C updates the affected address list "MAC_A, MAC_C" contained in the received flush message to "MAC_A" thus selected. Then the communication control apparatus C transmits a new flush message containing the updated affected address list "MAC_A" via the ports other than the port P1 via which the old flush message has been received, namely via the ports P2, P3, and P4. The communication control apparatus C also deletes the records containing the selected address "MAC_A" from the left table in FIG. 8, and renumbers the remaining records as illustrated on the right in FIG. 8.

Likewise, the communication control apparatus D receives the flush message transmitted from the communication control apparatus C via the port P1. The communication control apparatus D then looks up its own learning table similarly to the communication control apparatuses B and C, and extracts the address "MAC_F" associated with the port number P1 via which the flush message has been received. Then the communication control apparatus D compares the address "MAC_A" contained in the received flush message with the address "MAC_F" extracted from its own learning table, and determines that no address is contained in common in both of the received flush message and its own learning table. Accordingly, the communication control apparatus D discards the received flush message, without updating its learning table or flooding the flush message. Thus, the respective communication control apparatuses delete, from the learning table, only the addresses of apparatuses that may be affected by the trouble, update the affected address list, and transmit the updated affected address list to the apparatuses connected thereto.

Operation Flow according to Second Embodiment

An operation flow of the communication control apparatus will be discussed with reference to FIGS. 11 and 12. Specifically, an operation flow upon detecting a trouble will be discussed with reference to FIG. 11, and an operation flow upon receiving a flush message will be discussed with reference to FIG. 12. Here, it is assumed that the operations are performed by the communication control apparatus 10 illustrated in FIG. 2.

Operation Flow upon Detecting Trouble

Figure 11:
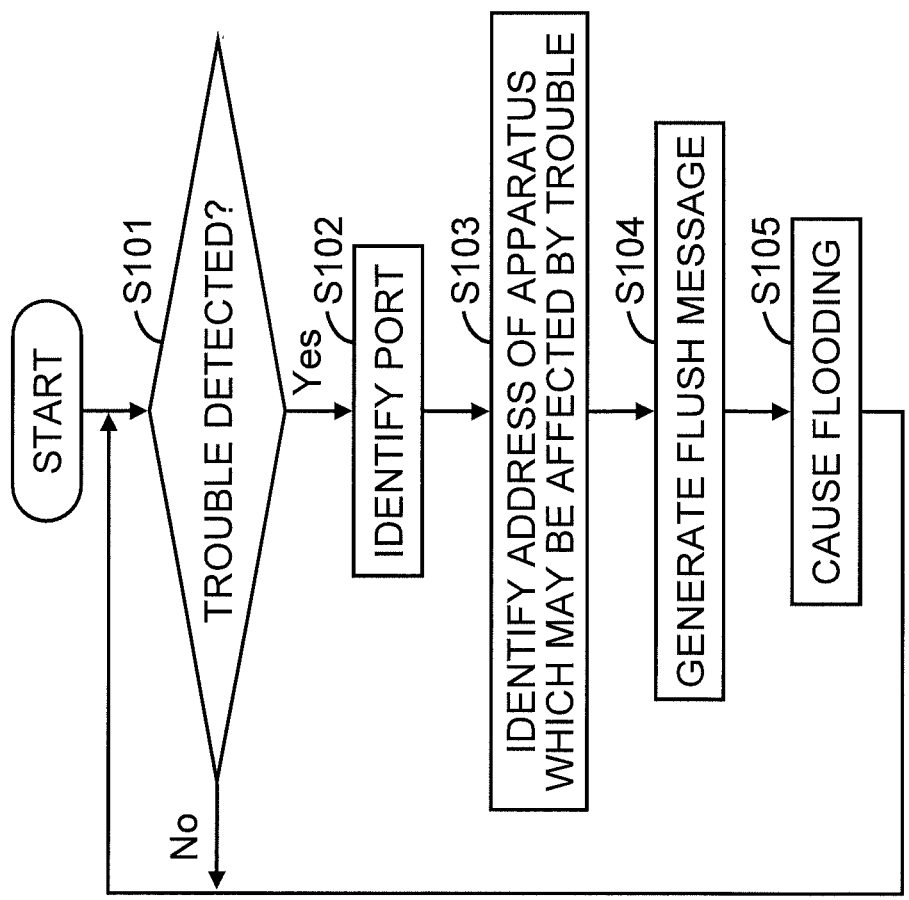
FIG. 11 is a diagram illustrating an operation flow performed by a communication control apparatus according to an embodiment of the present invention.

FIG. 11 illustrates an operation flow performed by the communication control apparatus upon detecting a trouble.

In S101, the trouble detection unit 15 of the communication control apparatus 10 waits for detecting a trouble.

In S102, upon detecting a trouble ("Yes" in S101), the trouble detection unit 15 identifies the port number of the port where the trouble has been detected.

In S103, the trouble detection unit 15 looks up the learning table 12 and identifies addresses associated with the identified port number as the addresses of apparatuses that may be affected by the trouble.

In S104, the trouble detection unit 15 generates a flush message containing an affected address list that contains the identified addresses.

In S105, the trouble detection unit 15 causes flooding, i.e., transmits the generated flush message via all the ports except for the port where the trouble has been detected. Thereafter, the communication control apparatus 10 returns the process to S101.

Operation Flow upon Receiving Flush Message

Figure 12:
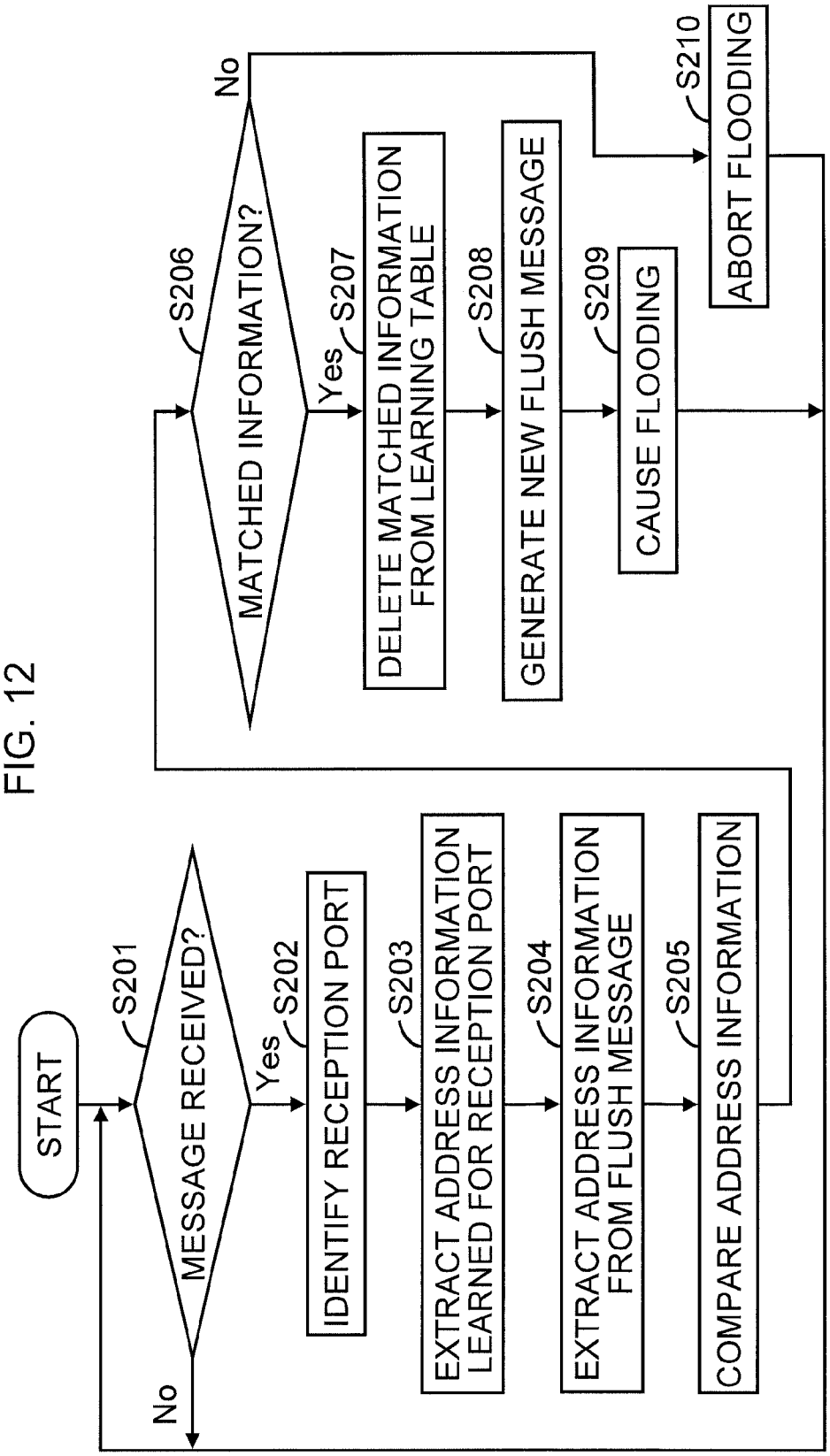
FIG. 12 is a diagram illustrating an operation flow performed by a communication control apparatus according to an embodiment of the present invention.

FIG. 12 illustrates an operation flow performed by the communication control apparatus upon receiving a flush message.

In S201, the extraction unit 16 of the communication control apparatus 10 waits for the reception unit 13 receiving a flush message.

In S202, when the reception unit 13 has received a flush message ("Yes" in S201), the extraction unit 16 identifies the port number of the port via which the flush message has been received.

In S203, the extraction unit 16 generates a list of learned addresses corresponding to the identified reception port. In other words, the extraction unit 16 extracts address information associated with the identified port number from the learning table 12.

In S204, the extraction unit 16 extracts address information from the affected address list contained in the received flush message.

In S205, the selection unit 17 compares the address information extracted from the flush message with the address information extracted from the learning table 12.

In S206, the selection unit 17 determines whether there is matched information as a result of the comparison, that is, address information contained in common in both of the address information extracted from the flush message and the address information extracted from the learning table 12.

In S207, when there is matched information ("Yes" in S206), the deletion unit 18 deletes the record containing the address contained in the matched information from the learning table 12.

In S208, the transmission unit 19 updates the affected address list contained in the received flush message with the address information selected by the selection unit 17 to generate a new flush message.

In S209, the transmission unit 19 transmits the new flush message via the respective ports other than the port via which the original flush message has been received. Thereafter, the communication control apparatus 10 returns the process to S201.

In S210, when there is no matched information ("No" in S206), the transmission unit 19 aborts to flood the received flush message, and the communication control apparatus 10 returns the process to S201.

Advantageous Effects of Second Embodiment

The communication control apparatus according to the second embodiment selects addresses of apparatuses that may be affected by the trouble on the basis of the affected address list contained in the received flush message and the port number of the port via which the flush message has been received, and deletes only the selected addresses from the learning table. The communication control apparatus then updates the affected address list contained in the received flush message and transfers the updated affected address list to other apparatuses connected thereto. Therefore, the respective communication control apparatuses may delete only the addresses of apparatuses that may be affected by the trouble to transfer the flush message, and consequently unnecessary flooding may be prevented.

Figure 13:
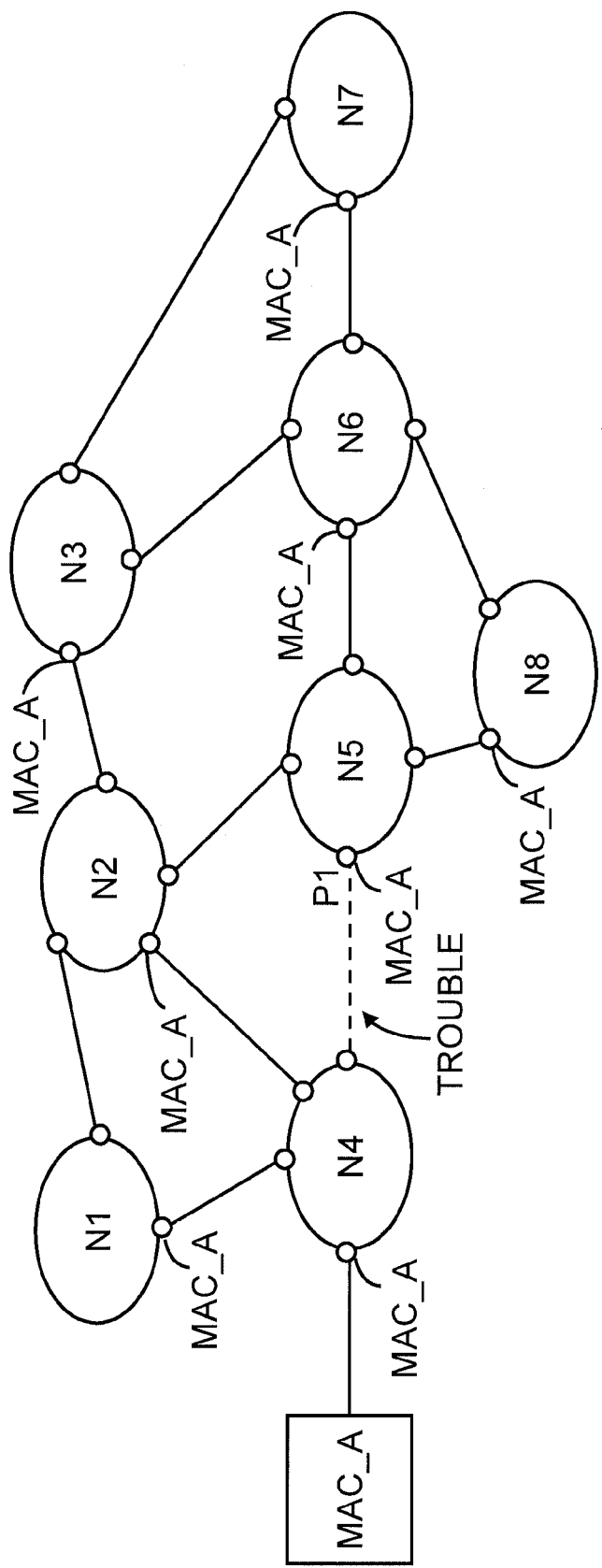
FIG. 13 is a diagram illustrating an exemplary network.
Figure 14:
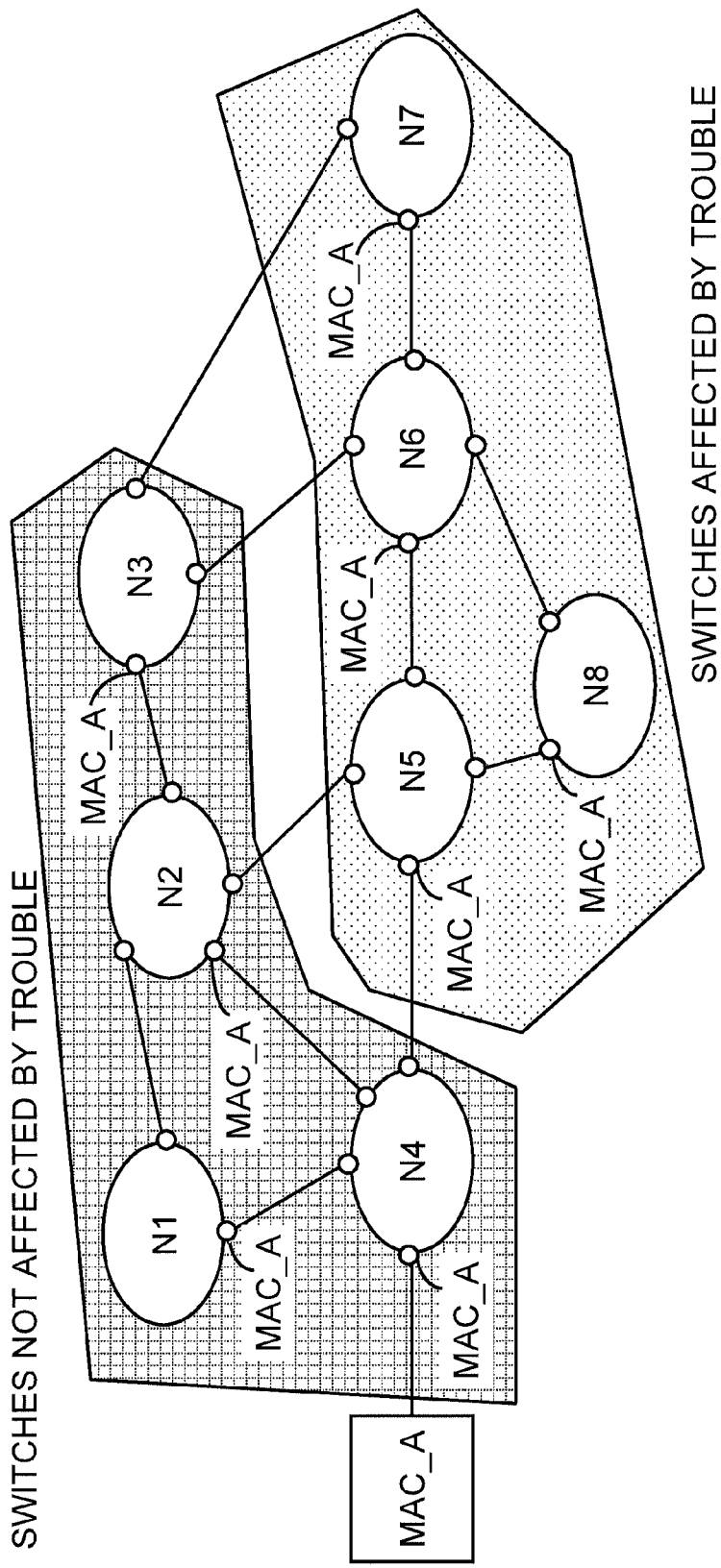
FIG. 14 is a diagram illustrating an infection of the trouble.

FIG. 13 illustrates an exemplary network, and FIG. 14 illustrates an infection of the trouble. A case where a trouble has occurred between N4 and N5 in the network illustrated in FIG. 13 will be discussed.

In the network illustrated in FIG. 13, communication control apparatuses N1 to N8 are connected. Specifically, N1 is connected to N2 and N4; N2 is connected to N1, N3, N4, and N5; N3 is connected to N2, N6, and N7; and N4 is connected to N1, N2, N5, and also to an apparatus having a MAC address MAC_A. N5 is connected to N2, N4, N6, and N8; N6 is connected to N3, N5, N7, and N8; N7 is connected to N3 and N6; and N8 is connected to N5 and N6.

Small circles attached to N1 to N8 in FIG. 13 denote the ports of the respective apparatuses. The port marked with "MAC_A" is the port registered as the transmission port of data destined for the apparatus having the MAC address MAC_A. As an example, N2 transmits data destined for the MAC address MAC_A to N4. Likewise, N8 transmits data destined for the MAC address MAC_A to N5.

In such a situation, when N5 detects a trouble at the port P1 via which N5 is connected to N4, N5 transmits a flush message containing an affected address list that contains the MAC address MAC_A via the ports other than the port P1. Specifically, N5 transmits the flush message to N2, N6, and N8. N2 does not update the learning table nor transfer the flush message to N1, N3, and N4, because the port via which the flush message has been received from N5 has not been registered as the transmission port for the affected address MAC_A. Even if N2 has received from N5 the information to the effect that the transmission route for the MAC address MAC_A is in trouble, N2 may discard the information since N2 transmits data to N4 when the data is to be transmitted to the MAC address MAC_A.

N6 deletes the MAC address MAC_A from the learning table and transmits the flush message to N3, N7, and N8, because the port via which the flush message has been received from N5 has been registered as the transmission port for the affected address MAC_A. N8 deletes the MAC address MAC_A from the learning table and transmits the flush message to N6, because the port via which the flush message has been received from N5 has been registered as the transmission port for the affected address MAC_A.

N7 deletes the MAC address MAC_A from the learning table and transmits the flush message to N3, because the port via which the flush message has been received from N6 has been registered as the transmission port for the affected address MAC_A. When N6 has received the flush message from N8, N6 does not update the learning table nor transfer the flush message to N3, N5, and N7, because the port via which the flush message has been received from N8 has not been registered as the transmission port for the affected address MAC_A.

N3 does not update the learning table nor transfer the flush message via respective ports other than the reception port upon receiving the flush message from N6 or N7 because the reception port has not been registered as the transmission port for the affected address MAC_A.

As discussed above, when N5 transmits the flush message containing the MAC address MAC_A in the network, the communication control apparatuses that may not be affected by the trouble do not update the learning table as illustrated in FIG. 14. In contrast, the communication control apparatuses that may be affected by the trouble update the learning table. Specifically, N1, N2, N3, and N4, from which data destined for the MAC address MAC_A is not transmitted through N5, do not update the learning table. On the other hand, N5, N6, N7, and N8, from which data destined for the MAC address MAC_A is transmitted through N5, update the learning table.

Thus, the network may be controlled such that only those communication control apparatuses that may be affected by the trouble update the learning table, and that the communication control apparatuses that may not be affected by the trouble do not update the learning table.

Third Embodiment

Although the embodiments have been thus far discussed, there may be other embodiments in various different forms. Some of such variations will be discussed.

Address Information

Although the MAC address is employed as the address information in the first and second embodiments, other types of information such as an Internet protocol (IP) address may be employed.

System

A part or whole of the operations that may be automatically performed according to the foregoing embodiments may be manually performed. Conversely, a part or whole of the operations that may be manually performed according to the foregoing embodiments may be automatically performed by a known method. In addition, the operation process, controlling process, and specific names described in this specification and the drawings, various data and information including parameters illustrated in FIG. 3, FIG. 4, and FIGS. 6 to 9, for example, may be modified as desired, unless otherwise stated specifically.

Further, the components of the apparatus illustrated in the drawings merely represent the respective functional concepts, and do not have to be physically configured as illustrated. For example, specific forms of separation or integration of the apparatus, such as integration of the extraction unit 16 and the selection unit 17, are not limited to those illustrated in the drawings. In other words, a part or whole of the configuration may be functionally or physically separated or integrated in desired units in accordance with various loads and circumstances of use. Further, the processing function of the respective apparatuses may be partially or totally realized by a central processing unit (CPU) and a program that may be analyzed and executed by the CPU, or may be realized as hardware based on a wired logic.

Program

The operations discussed in the foregoing embodiments may be realized by executing a program prepared in advance with a computer system such as a personal computer or a work station. Accordingly, an example of the computer system that executes a program having the functions equivalent to the embodiments will be discussed.

FIG. 15 illustrates an exemplary system configuration of a computer system that executes a communication control program. As illustrated in FIG. 15, the computer system 100 includes a bus 100a, to which a CPU 105, a read-only memory (ROM) 104, and a random access memory (RAM) 101 are connected. In the computer system 100, also, a network interface card (NIC) 102, a hard disk drive (HDD) 103, and a drive unit 106 for reading data from and/or writing data to a computer-readable medium 106a are connected to the bus 100a. The HDD 103 contains a learning table 103a corresponding to the learning table 12 illustrated in FIG. 2.

The ROM 104 contains a communication control program 104a. Alternatively, the communication control program 104a may be stored in another computer-readable medium 106a such as the RAM, a compact disc (CD), a compact disc read-only memory (CD-ROM), CD recordable (CD-R), CD rewritable (CD-RW) or the like, a digital versatile disc (DVD), DVD-ROM, DVD-RAM, DVD-R, DVD plus R (DVD+R), DVD-RW, DVD plus RW (DVD+RW), HD DVD or the like, a Blu-ray disc, a magnetic disk, an optical disc, or a magneto-optical disc. The communication control program 104a may be installed onto the HDD 103 from the computer-readable medium 106a, and loaded into the RAM 101 from the HDD 103 when executed by the CPU 105. A storage medium may be placed at a remote location and the computer may make access to the storage medium to thereby acquire the communication control program 104a. In this case, the acquired program may be stored in the HDD 103, for use thereby.

The CPU 105 reads out and executes the communication control program 104a, to thereby perform the operations equivalent to the reception unit 13, the switching control unit 14, the trouble detection unit 15, the extraction unit 16, the selection unit 17, the deletion unit 18, and the transmission unit 19, as a communication control process 105a. Thus, the computer system 100 reads out the communication control program 104a from the ROM 104 and executes the communication control program 104a, thereby working as a communication control apparatus that performs the communication control method.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A communication control apparatus comprising:
   a communication interface including a plurality of ports connected to external apparatuses;
   a storage unit to store, in association with a port number, first address information regarding apparatuses connected to a port identified by the port number; and
   a processor to execute a procedure including:
      receiving a first affected address list containing second address information regarding apparatuses which may be affected by a trouble,
      extracting the first address information stored in the storage unit in association with a port number of a port via which the first affected address list has been received,
      selecting third address information which is included in both the first address information and the second address information,
      updating the first affected address list by replacing the second address information with the third address information to acquire a second affected address list, and
      transmitting the second affected address list via each port other than the port via which the first affected address list has been received.

2. The communication control apparatus according to claim 1, wherein
   the processor deletes the third address information from the first address information stored in the storage unit.

3. The communication control apparatus according to claim 1, wherein
   the processor skips the update of the first affected address list and the transmission of the second affected address list when the third address information includes no address information.

4. A communication control method executed by a communication control apparatus, the communication control method comprising:
   receiving a first affected address list containing first address information regarding apparatuses which may be affected by a trouble;
   extracting second address information stored in a storage unit in association with a port number for identifying a port via which the first affected address list has been received, the port being one of ports included in the communication control apparatus and connected to external apparatuses;
   selecting third address information which is included in both the first address information and the second address information,
   updating the first affected address list by replacing the first address information with the third address information to acquire a second affected address list, and
   transmitting, by the communication control apparatus, the second affected address list via each port other than the port via which the first affected address list has been received.

5. A computer-readable, non-transitory medium storing a program that causes a computer to execute a communication control method comprising:
   receiving a first affected address list containing first address information regarding apparatuses which may be affected by a trouble;
   extracting second address information stored in a storage unit in association with a port number for identifying a port via which the first affected address list has been received, the port being one of ports included in the computer and connected to external apparatuses;
   selecting third address information which is included in both the first address information and the second address information,
   updating the first affected address list by replacing the first address information with the third address information to acquire a second affected address list, and
   transmitting the second affected address list via each port other than the port via which the first affected address list has been received.

* * * * *